UNITED STATES PATENT OFFICE.

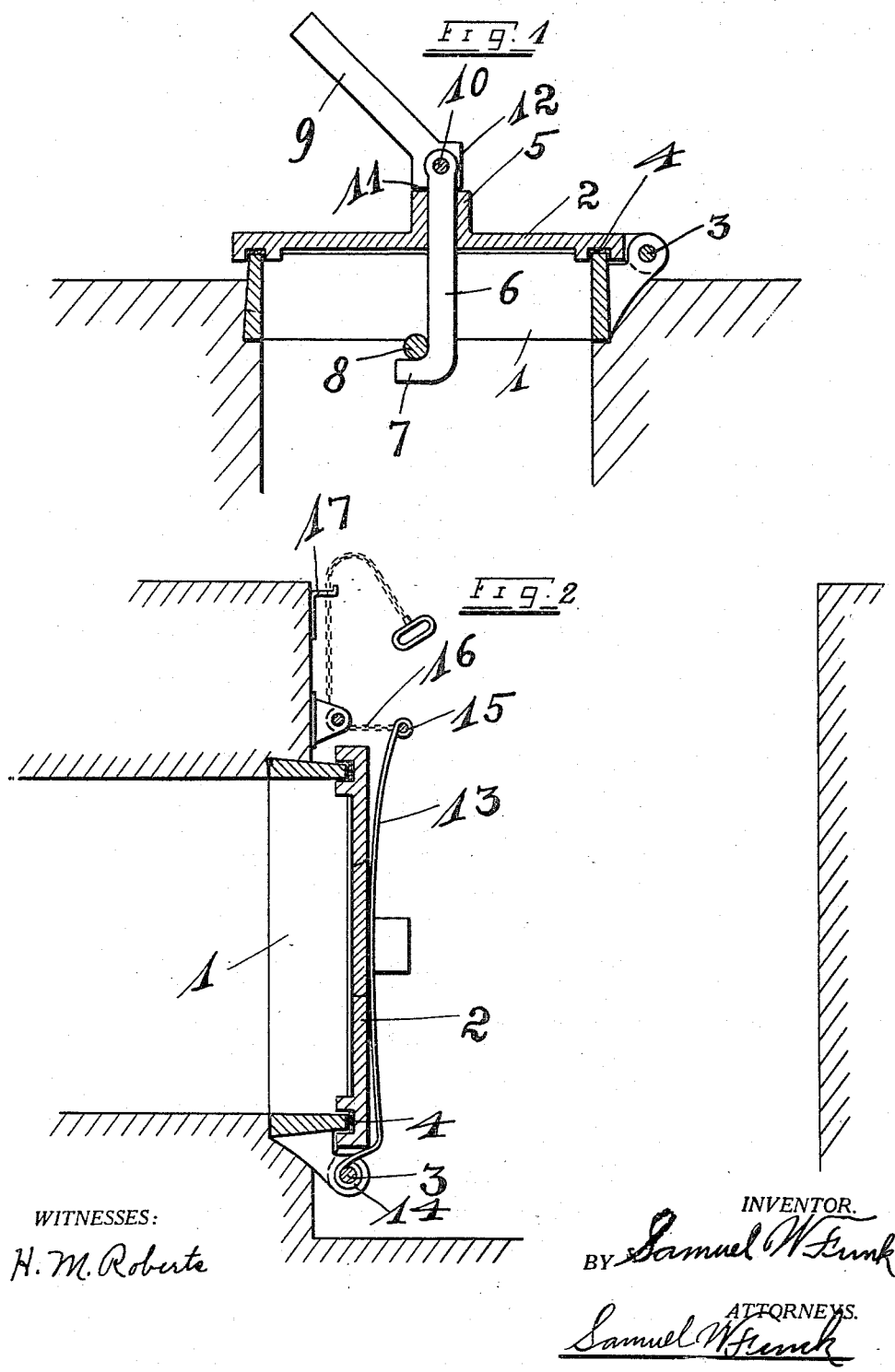

SAMUEL W. FUNK, OF CHARTER OAK, CALIFORNIA.

SAFETY IRRIGATING-VALVE AND PRESSURE-GATE.

1,285,110.  Specification of Letters Patent.  Patented Nov. 19, 1918.

Application filed October 22, 1917. Serial No. 197,769.

*To all whom it may concern:*

Be it known that I, SAMUEL W. FUNK, a citizen of the United States, residing at Charter Oak, in the county of Los Angeles and State of California, have invented new and useful Improvements in Safety Irrigating-Valves and Pressure-Gates, of which the following is a specification.

My invention relates to improvements in safety irrigating valves and pressure gates; and the objects of these improvements are, to prevent a bursting of the irrigating pipes; to relieve pressure gates in irrigating pipe lines automatically for the escape of air accumulating in such pipe lines; to provide a spring member in combination with the locking member in such valves and gates; the invention consisting in the construction, combination and arrangement of devices hereafter more fully described and claimed, and illustrated in the accompanying drawing, in which—

Figure 1 is a vertical sectional view of my device used as irrigating valve.

Fig. 2 is a vertical sectional view of my device used as pressure gate.

Similar numbers refer to similar parts throughout the papers.

In Fig. 1, the numeral "1" designates the frame of the device formed so as to allow a securing of the device into the concrete of irrigating pipes. The cover "2" is swingably attached to the frame by the hinge "3". A packing "4" is disposed in a suitable recess formed on the cover so as to tightly shut off the water in such irrigating pipes. Through the boss "5" on the cover, a tightening bar "6" is inserted terminating in a hook end "7". A bar "8", having springing capacity, is disposed below the frame inclosed in the concrete of the irrigating pipe with the frame so as to be engaged by the hook end "7" of the tightening and locking bar "6". A locking or operating lever "9" is pivotally attached to the locking bar "6" by the pin "10". The operating lever is provided with setting edges "11" and "12", being each at a different distance from the center of the pin "10" so as to procure a different setting of the locking bar when engaging over the spring bar "8".

Using this valve on top of the irrigating pipes, it will easily be understood that an over pressure in the irrigating pipes, often occurring in such pipe lines, will be released through the spring capacity of the spring bar "8", allowing the cover "2" to open enough to allow the accumulated air to pass out of the valve. Setting the lever "9" on the setting edge "11" naturally locks the cover rather tightly, while still allowing a slight escape of water or air accumulating in the pipes to an over pressure. When setting the lever on the setting edge "12" more water may escape and it is also easier to open the valve by turning the locking bar "6" with the hook end "7" so as to disengage from the spring bar "8". It will easily be understood that more setting edges can be provided instead of the two, "11" and "12", which would be at different angles, gradually increasing from the edge "12" to the desired farthest edge.

Another advantage over the valves now in use with irrigating pipes is that, in closing, the person can stand behind the cover when pressing the cover "2" down upon the frame "1", thereby being protected while the water is shooting out between the closing cover and the frame.

Using the device for a pressure gate in the standpipes such valves are usually quite a distance below the ground in the water, in such standpipes, and it is hard to handle any lever or locking bar without getting wet to an undesirable extent. I overcome such objectionable conditions by placing my spring on the outside in the shape indicated at "13". The lower end "14" of this spring is rolled so as to engage with the hinge connection "3", while the upper end "15" is shaped to allow the attachment of a chain, cable, or other similar suitable means "16" by which the valve can be closed. Using a chain, a hook "17" is provided near the upper edge of the standpipe so as to allow the engaging of the chain "16" in such a position as to suitably tighten the cover of the valve, still allowing the escaping of accumulated air in the pipe line by the springing capacity of the spring "15", as described above with reference to the device as used and illustrated in Fig. 1.

Having thus described my invention, I claim:

1. In a valve for controlling irrigation comprising a frame formed to be secured in the concrete of irrigating pipes, and a cover hingedly connected to the frame; a bar having springing capacity also secured in the concrete of the irrigating pipes below the frame of the device forming a yielding locking member, and a locking bar inserted through the cover of the valve and connecting the cover with the yielding locking member.

2. In a valve for controlling irrigation comprising a frame formed to be secured in the concrete of irrigating pipes, a cover hingedly connected to the frame, and locking means provided on the valve for holding the cover locked to the frame; an operating lever pivotally secured to the locking means having engaging edges adjacent to the cover, each edge at a different distance from the center of the pivot connection so as to allow a different setting of the cover in relation to the tightness between the cover and the frame.

In testimony whereof I hereunto affix my signature in the presence of two witnesses.

SAMUEL W. FUNK.

Witnesses:
ESTHER FUNK,
MABEL A. FUNK.

Copies of this patent may be obtained for five cents each, by addressing the "Commissioner of Patents, Washington, D. C."